United States Patent [19]
Shepherd et al.

[11] Patent Number: 5,793,559
[45] Date of Patent: Aug. 11, 1998

[54] IN DRIVE CORRECTION OF SERVO PATTERN ERRORS

[75] Inventors: Stanley H. Shepherd, Morgan Hill; Richard M. Ehrlich, Saratoga; James V. Wiseman, Palo Alto; Richard T. Curran, Los Altos; William R. Akin, Jr., Morgan Hill, all of Calif.

[73] Assignee: Quantum Corporation, Milpitas, Calif.

[21] Appl. No.: 607,507

[22] Filed: Feb. 27, 1996

[51] Int. Cl.$^6$ ................................................. G11B 5/596
[52] U.S. Cl. ......................................................... 360/78.09
[58] Field of Search ........................... 360/78.09; 324/212, 324/226

[56] References Cited

U.S. PATENT DOCUMENTS

| | | | |
|---|---|---|---|
| 3,881,184 | 4/1975 | Koepcke et al. | 360/78 |
| 4,424,543 | 1/1984 | Lewis et al. | 360/135 |
| 4,616,276 | 10/1986 | Workman | 360/77 |
| 5,072,318 | 12/1991 | Yu | 360/77.02 |
| 5,237,574 | 8/1993 | Weng | 371/40.1 |
| 5,420,730 | 5/1995 | Moon et al. | 360/77.08 |
| 5,444,583 | 8/1995 | Ehrlich et al. | 360/78.09 |
| 5,448,429 | 9/1995 | Cribbs et al. | 360/75 |

OTHER PUBLICATIONS

Magnetic Recording, vol. II, Computer Data Storage Mee et al., pp. 72–84, Dec. 1988.

*Primary Examiner*—Aristotelis M. Psitos
*Assistant Examiner*—Alan Faber
*Attorney, Agent, or Firm*—David B. Harrison; Debra A. Chun

[57] ABSTRACT

Embedded servo sectors within a data track of a hard disk drive including a rotating data storage disk and a closed loop rotary actuator structure for positioning a data transducer head relative to the data track are written by a method including the steps of positioning the rotary actuator structure relative to the data track with a laser-interferometer-based servo writer and writing a pattern of circumferentially sequential, radially offset fine position bursts within each servo sector with the data transducer head, this step including writing-in undetermined position errors within each pattern being written, moving the disk drive to a self scan environment away from the servo writer, operating the rotary actuator structure in closed loop for following the data track by reference to the servo burst pattern, extracting the undetermined position error from each pattern thereby to iteratively determine written-in position errors, generating burst correction values from the determined written-in position errors, and writing the burst correction values to the data track for later use by the closed loop rotary actuator structure during following of the data track to remove the written-in position errors.

6 Claims, 3 Drawing Sheets

001
IN DRIVE CORRECTION OF SERVO PATTERN ERRORS

FIELD OF THE INVENTION

The present invention relates to head positioner servo loops using servo patterns for positioning disk drive heads. More particularly, the present invention relates to a method providing one-time correction of written-in servo pattern errors within a disk drive, while servoing on those servo patterns, following the servo-writing operation.

BACKGROUND OF THE INVENTION

Modern high performance disk drives employ head positioner servo loops. The function of the head positioning servo system within the drive is two-fold: first, to position the read/write head over a data track with sufficient accuracy to enable reading and writing of that track without error; and, second, to position the write element with sufficient accuracy not to encroach upon adjacent tracks to prevent data erosion from those tracks during writing operations to the track being followed. In order to satisfy these requirements, the tracking system must be designed to reject disturbances. These disturbances include noise from sources such as spindle bearings, air turbulence, etc., and can be classified into two general categories, those that generate repeatable runout (RRO) and those that generate non-repeatable runout (NRRO). The term "repeatable" is used to describe periodicity on a revolution-by-revolution basis as opposed to a track-by-track basis. The response of the head positioning servo system to the RRO and NRRO sources is track misregistration (TMR). TMR can be classified into two groups, write-to-read, and write-to-write. Write-to-read TMR is the difference in the head trajectory during a write pass and any subsequent read pass of a data track (overwrite and readback ability). Write-to-write TMR is the difference in the head trajectory during a write pass and a subsequent trajectory during a write pass on a neighboring track (data erosion). This invention addresses a method of minimizing the RRO components that are a major source of write-to-write TMR.

Embedded servo systems derive head position information from servo information interspersed within the data blocks written on a surface of a rotating magnetic disk. One advantage of employing embedded servo information is that the same head and electronics is used to read both user data and head position information. One of the major sources of RRO is the servo write process that occurs during disk drive manufacturing. During servo write, position information is written within each data track as embedded servo sectors. This position information, usually in the form of a pattern of circumferentially sequential, radially offset servo bursts within each servo sector, nominally defines the center of the track. This servo information must be written with great fidelity as it is read back by the read element of the head during drive operation to determine the position of the head relative to the data track. The NRRO disturbance (bearing noise, air turbulence, servo writer vibration, etc.,) that occurs during servo write is essentially frozen into the written position information and becomes the RRO for the particular track.

Once a servo pattern has been written, the resulting Position Error Signal (PES) can be measured and the RRO for each servo sample calculated. The resulting RRO values can then be written back into each servo sample in a digital format. (Analog burst trimming by overwrite is still subject to NRRO). There are two opportunities to determine the RRO: at the servo writer station during servo writing, and "off line" during subsequent drive self testing following the servo write process.

Measuring and writing the resulting RRO correction on the servo writer is reasonably straight forward. However, one disadvantage arising from using the servo writer for this purpose is the time required for, and therefore the cost associated with, using the servo writer station. Embedded servo sector burst patterns are typically written in a clean room environment with the aid of a laser-interferometer-based servo writer. These servo writers are relatively expensive in relation to other capital equipment needed to assemble and format disk drives. The more rapidly the servo-writing process is carried out, the less time will be consumed at the servo writer station during manufacturing, with a reduction in the number of servo writer stations needed for mass production and a resultant reduction in the cost burden or overhead associated with each disk drive. Ideally, as few passes for each track as possible should be made at the servo writer station to write the servo patterns for each track.

It is known with a disk drive how to extract and correct for RRO. One example of a disk drive apparatus including an on-board triggered digital sampling analyzer capable of extracting traces and correcting for once-around repeatable runout is found in commonly assigned U.S. Pat. No. 5,444,583 to Ehrlich et al, the disclosure thereof being incorporated herein by reference. An earlier U.S. Pat. No. 3,881,184 to Koepcke et al., entitled: "Adaptive Digital Servo System", described a head position servo control apparatus and method for extracting, processing, storing, and applying feed-forward correction values derived from fundamental frequency and the first eight harmonics of RRO of a disk spindle. The Koepcke et al. patent is also incorporated herein by reference.

As noted above, one known way to measure written-in servo pattern errors is to employ the servo writer to measure these errors immediately after writing of the servo burst patterns and before the drive head-disk assembly (HDA) is removed from the servo writer. Before the HDA leaves the servo writer, the fine position servo bursts are measured by the servo writer, and the amount of any written-in error is digitally recorded in a synchronous manner as a servo correction number (SCN) in a reserved field located near the servo bursts. Later, during disk drive data storage and retrieval operations, the SCN is read and fed into the digital head position servo control loop as a correction to, and thereby cancel, written-in servo position errors. Commonly assigned U.S. Pat. No. 5,237,574 to Weng, entitled: "Error-Resilient Information Encoding", describes a method for detecting and correcting errors in data block headers, including a SCN field. This patent is incorporated by reference.

One of the advantages of the SCN approach is that after the servo writer has written the burst patterns and has developed the SCNs, later passes are used to write the remainder fields of each servo wedge, including the SCNs, in a phase coherent manner. With a single phase coherent writing episode at the servo writer, a relatively smaller error correction code (ECC) or error detection code (EDC) effort is required to protect the SCN fields, and this reduced effort results in a smaller, and therefore more efficient, servo sector layout. However, this prior procedure increases the time each HDA spends on the servo writer, and additional servo writer time represents additional manufacturing costs for the HDA.

Following servo writing, the HDA may be combined with a suitable digital electronics board to complete the disk drive

3 assembly procedure. Once assembled, the disk drive is conventionally placed within a test chamber where it is operated under a variety of stressful operating conditions, such as elevated and/or reduced temperature, and elevated altitude (low ambient pressure), for example. These chambers are frequently referred to as drive "self-scan" test chambers. Most drive failures, if they are likely to occur, will occur during self-scan within one of these chambers, very early in the operational life of the drive. Since the time the drive spends in self-scan is much less costly than time spent at the servo writer station, it would be preferable to measure and record written-in servo burst errors during drive test within the test chamber. However, in drive test, the drive is servoing upon the same data that it would have to measure, with a clear consequence that the position offsets measured from the relative burst amplitudes are a result of the response of the servo system to the written-in errors and not the same as the written-in or "raw" offsets which are measurable at the servo writer. Accordingly, a hitherto unsolved need has arisen for an improved method for post servo writer correction of written-in servo pattern errors within a disk drive.

SUMMARY OF THE INVENTION WITH OBJECTS

A general object of the present invention is to provide an improved method for extracting and recording RRO correction values within a disk drive following servo writing for correcting written-in servo pattern errors in the drive in a manner overcoming limitations and drawbacks of the prior art.

In one aspect of the invention, a method is provided for writing embedded servo sectors within a data track of a hard disk drive including a rotating data storage disk and a closed loop rotary actuator structure for positioning a data transducer head relative to the data track. This new method comprises the steps of:

positioning the rotary actuator structure relative to the data track with a laser-interferometer-based servo writer and writing a pattern of circumferentially sequential, radially offset fine position bursts within each servo sector with the data transducer head, this step acknowledges writing in undetermined position errors within each pattern being written, removing the disk drive from the servo writer and installing the disk drive into a self scan environment, while the disk drive is operating within the self scan environment and the rotary actuator structure is operating closed loop following the data track by reference to the servo burst pattern, extracting the undetermined position errors from each pattern thereby to determine written-in position errors, generating RRO correction values from the determined written-in position errors, writing the RRO correction values to the data track, and using said correction values during following of the data track to remove the RRO errors.

In this method, the step of extracting the undetermined position errors from each pattern while the drive is operating within the self scan environment may comprise the steps of:

developing a representative kernel while operating the head position servo in a closed loop fashion, servoing upon the data track by reading, with the data transducer head, the servo sector fine position bursts and recovering a position error for each servo sector including the written-in errors,

4 extracting the written-in error from the position errors by use of repeated measurements and the kernel to provide the RRO correction value for each servo sector, using those RRO corrections values in a closed loop iterative fashion to drive the RRO correction value error term toward zero, and recording the RRO correction value in a special data field within the corresponding servo sector.

In this method, the step of developing a representative kernel while operating the head position servo in a closed loop fashion may comprise the steps of:

off-line simulating the closed loop system, or by injecting identification signals into the head position servo system while operating in a closed loop fashion, determining the open loop transfer function of the head positioner servo, evaluating a form of the open loop transfer function at selected harmonic frequencies of the disk rotational speed to obtain the kernel as a time domain series.

In this method, the step of extracting the written-in errors from the position error by use of the kernel to provide a RRO correction value for a corresponding servo sector may comprise the steps of:

convolving a sequence of position errors, representing a single or multiple revolutions of the disk, with the kernel to produce the RRO correction values, providing a RRO correction table in memory within the disk drive for storing the RRO correction values, using said RRO correction table in the position calculations to iteratively improve the RRO correction values.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF A PREFERRED EMBODIMENT

Figure 1:
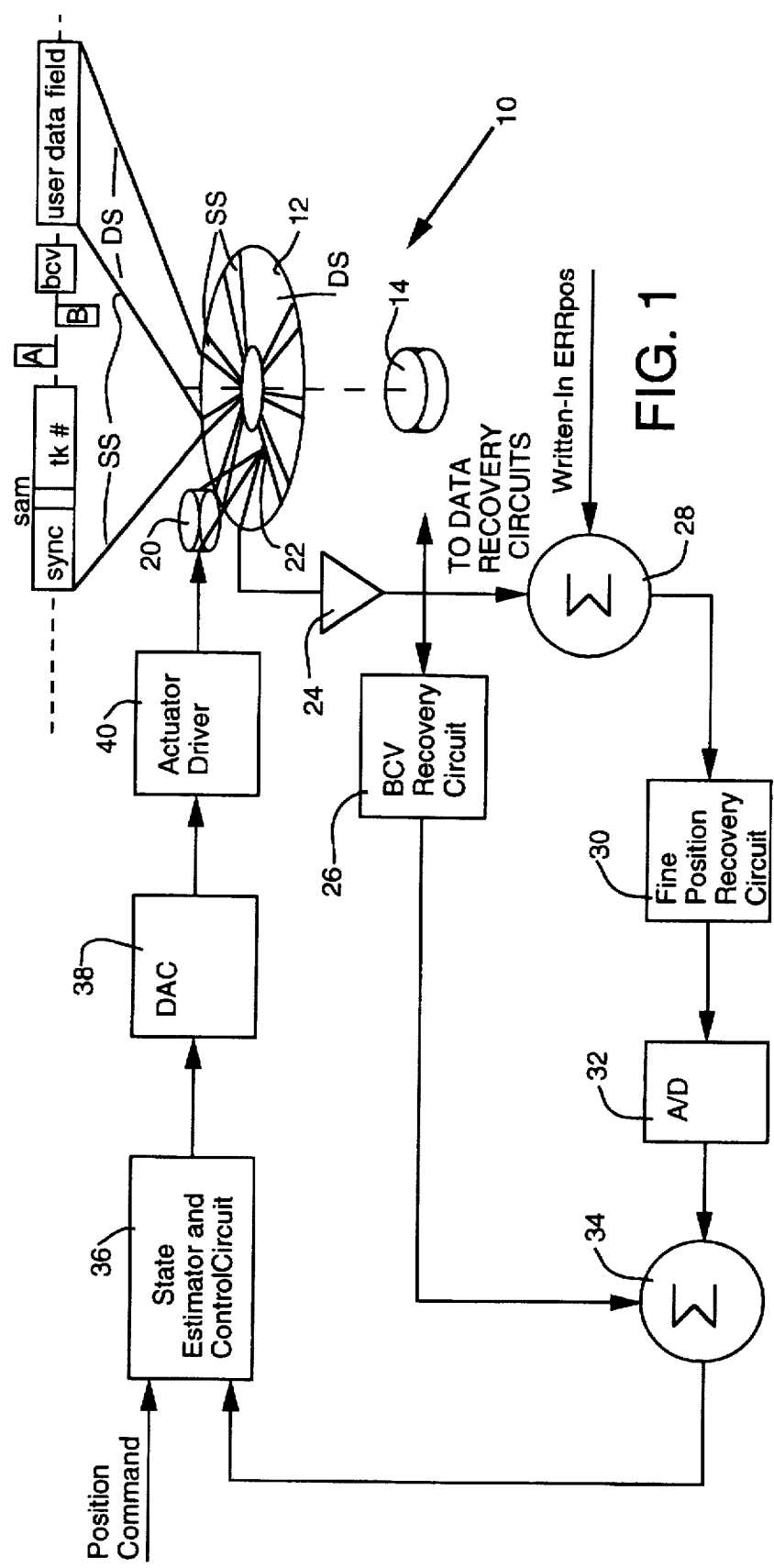
FIG. 1 is a simplified functional block diagram of a disk drive incorporating principles and aspects of the present invention.

With reference to FIG. 1, a disk drive 10 includes a rotating data storage disk 12 which is rotated at a predetermined angular velocity by a speed-regulated disk spindle motor 14. The disk 12 defines a multiplicity of concentric data track locations. Each data track includes a sequence of user data sectors DS interrupted by a series of embedded servo sectors SS as graphed in the enlarged track segment in FIG. 1. In the enlarged track segment, each servo sector is shown typically to include a sync field, a servo address mark field, a track number field, and fine-position-providing servo bursts (e.g. circumferentially staggered, radially offset bursts A and B) and one or more burst correction value (BCV) fields. The servo sector SS is followed by a user data field DS which may or may not include a user data field header and which may be interleaved for error correction code purposes and have error correction remainder bytes appended at the end of a sequence of user data, as is conventional and not particularly a part of the present invention.

The disk drive 10 also includes a rotary actuator assembly 20 for positioning a data transducer head 22. The head 22 is positioned by the actuator 20 at each selected one of the data tracks for data transfer operations, and for reading the embedded servo information recorded in each servo sector SS. Minute electrical signals induced from recorded magnetic flux transitions are amplified by a preamplifier 24 and then delivered to conventional disk drive data recovery circuits (not shown). A burst correction value (BCV) circuit 26 is shown, and it functions to recover a digital burst correction value from the BCV field.

A summing node 28 is also included in a signal path downstream from the preamplifier 24 and denotes addition of an unknown position error component RRO which was written into the servo sector SS during conventional servo writing operations at a laser-interferometer-based servo writer station. This position error RRO is added to relative amplitude values read from the fine position A and B servo bursts and recovered as a sum by a fine position recovery circuit 30, which may be a conventional servo peak detector or other integrating detector for recovering relative amplitudes of the e.g. A and B servo bursts as read by the head 22. These relative amplitudes (corrupted by the written-in position error RRO) are then quantized by an analog to digital converter 32 and supplied to a head position controller circuit 36. In the data stream from the converter 32, a summing node 34 combines a burst correction value (BCV) as read from the BCV field of the present servo sector with the digitized position value in order to cancel out the position error RRO.

The controller circuit 36 receives head position command values from other circuitry within the disk drive 10 and combines the command values with the quantized and corrected head position values to produce a commanded actuator current value. This commanded current value calculated by node 36, converted into an analog value by a digital to analog converter 38, and applied to control an actuator driver circuit 40 which operates the rotary actuator 20 to adjust the position of the head 22 relative to the data track being followed.

Figure 2:
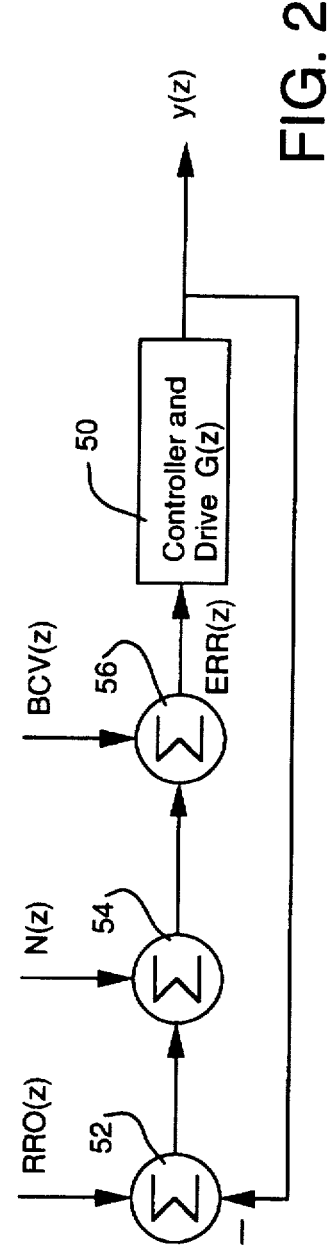
FIG. 2 is a discrete model of the FIG. 1 disk drive system and is illustrative of principles and aspects of the present invention.

In FIG. 2, the disk drive 10 including its on-board head position servo controller 36 and associated circuitry, is modeled as, but not limited to, a discrete time dynamic system G(z) included within block 50. In this exemplary model, let z represent the Laplace time advance operator as is commonly used to transform continuous time systems to discrete time systems and let the transform of the time series rro(t) be represented as RRO(z). The dynamic system is subjected to an unknown repeated disturbance RRO(z) added at a summing node 52. Another unknown disturbance N(z), which is assumed zero mean pink noise, is added at a summing node 54 to the head position signal. Finally, a specified correction signal BCV(z) is added to the disturbed head position signal at a summing node 56. These three influences produce a combined influence ERR(z) which is the error term that drives the model 50. The resulting closed loop transfer function may be defined as:

$$ERR(z)=BCV(z)+N(z)+RRO(z)-G(z)\cdot ERR(z)$$

which may be rearranged as:

$$BCV(z)+N(z)+RRO(z)=ERR(z)\cdot[1+G(z)];$$

The RRO signal is, by definition, periodic. Being periodic, it is discrete in the frequency domain and can be represented as a finite length z-polynomial. Since it repeats every revolution of the disk spindle, it can be expressed as a summation of the various harmonics of the spindle. In fact, the only parts of rro(t) that exist are those that occur at $\omega_i$, i=0 to M/2 where M is the number of servo position samples per revolution. Since G(z) is a linear system excited by a periodic signal rro(t), the only parts of G(z) of interest here are those at each $\omega_i$. We treat the whole system as a summation of discrete systems, each operating at $\omega_i$ and solve each individually.

For a given $\omega_i$, the calculation of $BCV(j\omega_i)$ is straight forward, by measuring $ERR(j\omega_i)$ (via discrete Fourier transform (DFT) or similar method), and knowing $1+G(j\omega_i)$, we calculate $RRO(j\omega_i)$ from:

$$BCV(j\omega_i)+N(j\omega_i)+RRO(j\omega_i)=ERR(j\omega_i)\cdot[1+G(j\omega_i)];$$

The process of taking DFTs of err(t) at each $\omega_i$ and scaling each by the corresponding $1+G(j\omega_i)$ is the same as convolving err(t) with a kernel made from the response of $1+G(z)$ evaluated at each $\omega_i$. Thus, we convolve the signal err(t) with the kernel to yield:

$$bcv(t)+n(t)+rro(t)=err(t)\circledast kernel;$$

where $\circledast$ represents the convolution operator.

In accordance with principles and aspects of the present invention, the impact of the zero mean noise term, n(t) is minimized by averaging, or low pass filtering with an asymptotically decreasing time constant, either err(t), or err(t)-rro(t), for multiple revolutions of the spindle. The number of revolutions necessary is dependent upon the frequency content of the n(t) term. An n(t) having significant spectra near the spindle harmonics will require more revolutions of data filtering to sufficiently differentiate the spectra of rro(t) from n(t). In the presence of sufficient filtering, n(t) becomes small and the left side of the above equation reduces to:

$$bcv(t)+rro(t)$$

which is the error between our calculated BCV values and the RRO values themselves. This format lends itself to an iterative solution:

$$bcv(t)_0=0;$$
$$bcv(t)_{k+1}=bcv(t)_k+\alpha\cdot err(t)_k\circledast kernel;$$

where $\alpha$ is a constant near unity selected to yield a convergence rate that is forgiving to mismatches between the actual transfer function and that used to generate the kernel.

In accordance with principles and aspects of the present invention, the kernel is derived for each different disk drive product, by a process of either control system simulation or by injecting identification signals into the servo control loop and measuring responses to those signals. The injection of identification signals into the servo control loop may preferably be carried out in accordance with teachings of the Ehrlich et al. U.S. Pat. No. 5,444,583, discussed and incorporated hereinabove.

Figure 3:
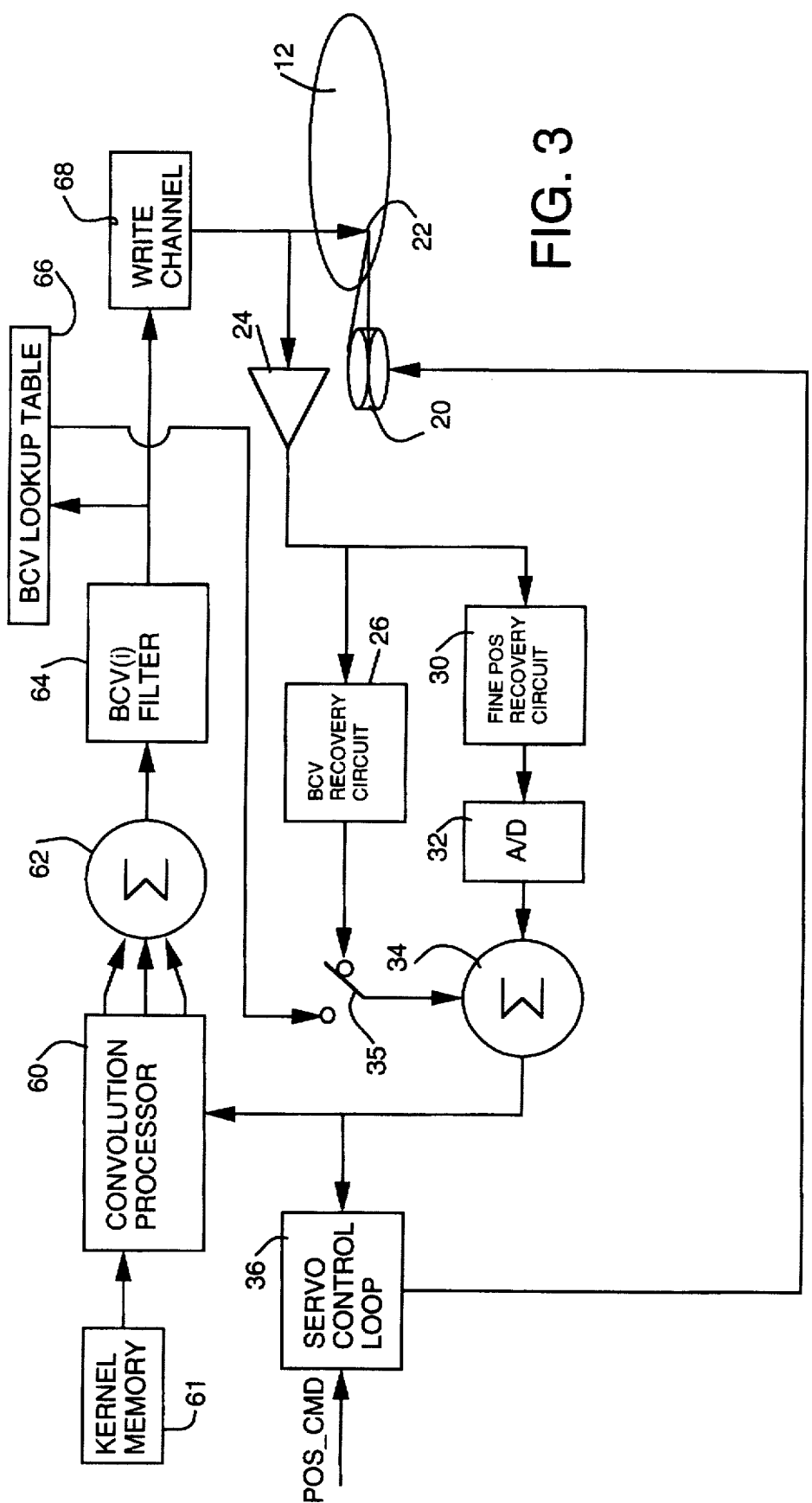
FIG. 3 is a block diagram of disk-drive-resident elements employed in generating burst correction values in accordance with principles of the present invention.

As used herein the term "kernel" is defined as a characterizing component that is derived ahead of time with respect to the particular disk drive design. Later on, as shown in FIG. 3, during a BCV generation process, the kernel stored in a kernel memory 61 is convolved with a stream of position data from the drive within an on-board convolution processor 60. Within the convolution processor 60 two digital data streams are run across each other in conventional fashion, and at each step the components that line up are multiplied, and the products are then summed within a summing junction 62. In the FIG. 3 embodiment, a switch 35 selectively enables the summing junction 34 to receive BCVs from disk 12 via preamplifier and the BCV recovery circuit 26, and from disk drive memory containing the BCV lookup table 66.

Figure 4:
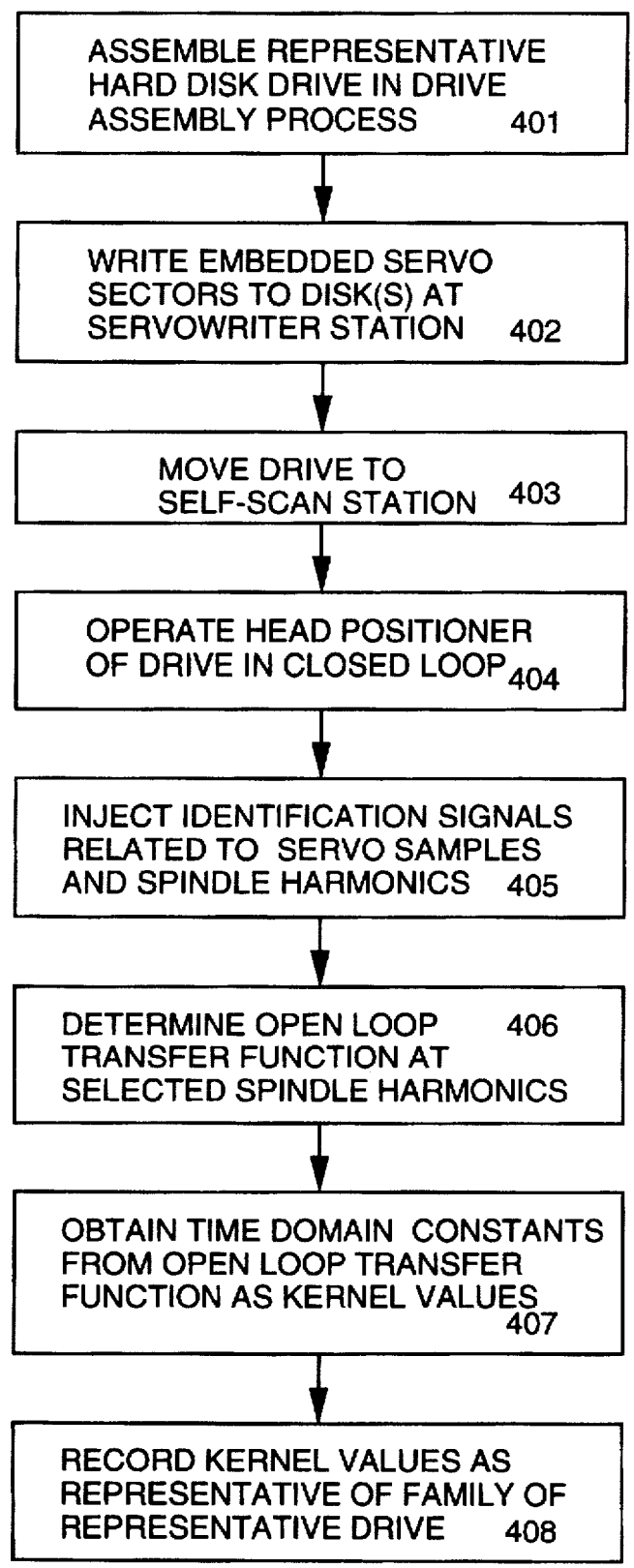
FIG. 4 is a flow chart illustrating a sequence of steps as one example of the present invention.

In accordance with principles and aspects of the present invention, and as shown in FIG. 4, the hard disk drive is assembled (step 401) and servo-written at a servo-writing station (step 402) before being moved to a self-scan station (step 403) at which the drive is powered up and the head positioner is operated in a closed-loop (step 404). Thereupon, the method of obtaining the kernel may comprise the steps of:

- obtaining the open loop transfer function of the head positioning servo either by system simulation or suitable on-line identification techniques (step 405),
- evaluating a form of the open loop transfer function at selected spindle harmonics (step 406), and
- computing the time response of such a system (inverse DFT) as a summation of the selected spindle harmonics in order to obtain a time domain set of constants (step 407) for the constant convolution process carried out within the convolution processor 60.

This process specifically generates a kernel value for each of the M servo samples representing one revolution of the disk spindle. These kernel values are then stored (step 408) in the kernel memory 61 and read out in synchronism to the convolution processor 60 with the position error values read from the servo sector bursts servo written in the data tracks of disk 12. In the presently preferred disk drive architecture 10, there are 58 embedded servo sectors SS therefore 58 samples per each rotation of the disk and therefore 58 elements in the kernel for each track.

In accordance with principles and aspects of the present invention, the harmonics at which a form of the open loop transfer function is evaluated to generate the kernel are picked to select the harmonics of the RRO that are of interest and to specifically eliminate the following harmonics:

- those harmonics of the RRO that are time varying to a degree that they cannot be characterized during self-scan and must be addressed through other control mechanisms (Examples of which are the zeroth harmonic (bias forces) and the first harmonic (disk slip). These examples are typically addressed by bias estimators and synchronous feedforward techniques operating dynamically within the drive's head position closed loop servo control process); and,
- those harmonics where transfer function is not well known or not constant (For example, at high frequencies the system does not behave as a lumped parameter model and the phase is not constant across the actuator stroke, and certainly not across a population of drives of the same nominal design or disk drive family).

Preferably, a number of drives of a particular disk drive family are sampled to check the kernel. Either an appropriate population of samples will be taken and averaged, or the kernels derived from a first drive will be verified by replication on the other drives of the sample group. Any time a change is made to the servo control process or the disk drive plant design, matching kernels will be developed and used to generate the BCVs. The BCVs themselves are insensitive to changes in the servo transfer function.

Once the kernel values are derived and recorded, they are distributed to all disk drives of the family during a self-scan download operation from a control computer controlling and monitoring the digital self scan process following servo writing. Using the same control system that was used to generate each kernel, the disk drive servo control is operated in closed loop and collects a stream of servo fine position data from the servo bursts. As part of the normal sample control process each servo sector is sampled and the fine position information is extracted from e.g. the servo bursts A and B. This value includes the written-in position error, which so far remains undetected and uncompensated. As the position errors are received, the servo control 36 reacts to those errors in light of each position command.

In addition, the position errors are fed into the convolution filter 60 preferably implemented as firmware in a digital processor resident within the disk drive. The convolution filter 60 is a separate function within the disk drive which is established and enabled during the digital self scan process. Each position error is received into the convolution filter 60 and the convolution process generates a sum within the summing node 62. For a given position error, whatever it is, the convolution filter convolves the kernel against one spindle revolution's worth of previous position errors. And the answer is the incremental $k+1^{th}$ correction. The correction gets summed into the previous $BCV_k$. So, at this stage, the BCVi is stored in a memory location. After this process has been repeated for e.g. four or five spindle revolutions, a stable sequence of BCV values are derived at a BCV filter circuit 64. Each BCV is located within an on-board lookup table 66 that is needed to cancel out the written-in position error at each particular servo sector SS. The BCV correction vector is then written via an on-board write channel 68 into the BCV field of the servo sectors in disk drive 10.

Each block storage location within a track recorded on the disk 12 typically includes the servo sector SS and the data sector DS. Since the servo sector SS was written at the servo writer during a servo writing operation, the servo sector SS is "write protected" against overwrite by the drive's write channel 68. In contrast, the data sector is where the write channel 68 is permitted to write user data to disk. Before the BCVs are written, each servo sector SS is shortened slightly, so the write channel 68 can be enabled during digital self scan to write the BCV correction vector to the BCV field. Shortening of the servo sector SS only occurs during the self scan process, and each entire servo sector SS including the BCV field is write-protected during subsequent disk drive operation by a user.

In one preferred implementation, once the BCVs have been calculated, they are passed through the write channel 68 and written to the BCV field within the servo sector. A suitable error detection code (EDC) such as a parity bit, or a more complicated error detecting and correcting code (ECC) may be included within the BCV field to protect the accuracy of each BCV. Because a write splice occurs at the BCV field, a suitable sync field pattern must precede the BCV field to enable the read channel phase locked loop (PLL) to establish phase lock before reading the BCV vector.

The BCV vector value for the present servo sector SS is preferably placed in that sector, on the basis that the digital BCV vector value can be read and recovered faster than the peak values and differences from the A and B servo bursts can be read to arrive at the uncorrected position error. Alternatively, it is possible to write a pattern asynchronously and recover it with an approach described in commonly assigned U.S. Pat. No. 5,420,730 to Moon et al., entitled:

"Servo Data Recovery Circuit for Disk Drive Having Digital Embedded Sector Servo", the disclosure thereof being incorporated herein by reference. Again, the drawback to the asynchronous approach is the amount of overhead required in the servo sector needed to provide a robust quasi-asynchronous BCV pattern.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A method for generating a representative kernel for a family of disk drives of a same nominal design in order to create servo burst correction values for correcting written-in errors of servo sector fine position information embedded in data tracks of hard disk drives of the family, each hard disk drive of the family having a head positioner servo system for positioning a data transducer head relative to a data track defined on a storage disk rotating at a predetermined rotational speed, the method comprising the steps of:

injecting identification signals into the head positioner servo system of a representative hard disk drive of the family while the servo system is operating in a closed loop, determining an open loop transfer function of the head positioner servo system while operating in closed loop, and evaluating a form of the open loop transfer function of the head positioner servo system at selected harmonic frequencies of the data storage disk rotational speed to obtain the kernel as a time domain series.

2. The method for generating a representative kernel set forth in claim 1 wherein the servo sector fine position information embedded in data tracks comprises a plurality of servo sectors each including at least a pair of circumferentially sequential servo bursts longitudinally offset from each other and from a nominal track centerline and wherein a kernel value is generated for each circumferential servo sector.

3. The method for generating a representative kernel set forth in claim 2 wherein the step of injecting identification signals into the head positioner servo system comprises the step of applying sine wave excitation to the servo system at predetermined harmonics above a fundamental frequency of disk rotational speed.

4. The method for generating a representative kernel set forth in claim 3 wherein the step of applying sine wave excitation to the servo system comprises the step of successively applying sine waves for the second through the n/2 harmonics of the fundamental frequency, where n equals a number of servo sectors within a said data track during one revolution of the disk to develop a kernel for each sector.

5. The method for generating a representative kernel set forth in claim 1 wherein the step of evaluating a form of the open loop transfer function of the head positioner servo system comprises the step of evaluating a response of a discrete time dynamic system model of the head positioner servo system.

6. The method for generating a representative kernel set forth in claim 5 wherein the response of the discrete time dynamic system model of the head positioner servo system is evaluated for each sample of servo sector fine position information.

* * * * *